United States Patent
Bitan et al.

(10) Patent No.: US 11,812,139 B1
(45) Date of Patent: Nov. 7, 2023

(54) CLOSED LOOP DYNAMIC ISP THROTTLING

(71) Applicant: SAMSUNG ELECTRONICS CO., LTD., Suwon-si (KR)

(72) Inventors: Gal Bitan, Tel-Aviv (IL); Tal Bernstein, Tel-Aviv (IL); Ilya Romm, Tel-Aviv (IL); Yoram Furth, Tel-Aviv (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/807,854

(22) Filed: Jun. 20, 2022

(51) Int. Cl.
| | |
|---|---|
| *H04N 23/65* | (2023.01) |
| *G06T 7/90* | (2017.01) |
| *G06T 7/00* | (2017.01) |
| *H04N 23/80* | (2023.01) |
| *H04N 23/88* | (2023.01) |

(52) U.S. Cl.
CPC ......... *H04N 23/651* (2023.01); *G06T 7/0002* (2013.01); *G06T 7/90* (2017.01); *H04N 23/80* (2023.01); *G06T 2207/30168* (2013.01); *H04N 23/88* (2023.01)

(58) Field of Classification Search
CPC ...... H04N 23/651; H04N 23/80; H04N 23/88; G06T 7/0002; G06T 7/90; G06T 2207/30168
See application file for complete search history.

(56) References Cited

U.S. PATENT DOCUMENTS

| | | | |
|---|---|---|---|
| 9,037,030 B2 * | 5/2015 | Tsukada | G03G 15/5004 399/37 |
| 9,106,948 B2 | 8/2015 | Brouillette | |
| 9,188,791 B2 | 11/2015 | Ishii | |
| 9,369,772 B1 | 6/2016 | Fei | |
| 9,418,320 B2 | 8/2016 | Chang et al. | |
| 9,491,333 B2 | 11/2016 | Ubik et al. | |
| 10,465,230 B2 | 10/2019 | Walls | |
| 10,567,637 B2 | 2/2020 | Tabuchi et al. | |
| 10,715,750 B2 | 7/2020 | Berner et al. | |
| 10,855,939 B1 * | 12/2020 | Xu | H04N 25/40 |

(Continued)

FOREIGN PATENT DOCUMENTS

KR   10-0929710   11/2009

OTHER PUBLICATIONS

Zhe Wei, et al. "Contrast-Guided Image Interpolation, IEEE Transactions on Image Processing", vol. 22, No. 11, Nov. 2013, pp. 4271-4285.

(Continued)

*Primary Examiner* — Hung H Lam
(74) *Attorney, Agent, or Firm* — F. CHAU & ASSOCIATES, LLC

(57) ABSTRACT

A method of controlling power usage in an image signal processor includes measuring an actual percentage of flat pixels in a digital image, adjusting a percentage threshold of flat pixels in the digital image, based on the measured actual percentage of flat pixels in the digital image; and processing the digital image by the image signal processor based on the percentage threshold of flat pixels. The percentage threshold of flat pixels is adjusted to reduce power used by the image signal processor in processing the digital image.

19 Claims, 5 Drawing Sheets

(56) References Cited

U.S. PATENT DOCUMENTS

| | | | |
|---|---|---|---|
| 2007/0182627 A1* | 8/2007 | Ueno | G06F 1/3203 |
| | | | 455/343.1 |
| 2014/0340528 A1* | 11/2014 | Park | H04N 25/63 |
| | | | 348/187 |
| 2015/0181118 A1* | 6/2015 | Suzuki | H04N 23/651 |
| | | | 348/231.99 |

OTHER PUBLICATIONS

Jun Xie, et al., "Edge-Guided Single Depth Image Super Resolution" IEEE International Conference on Images Processing, 2014, pp. 3773-3777.

Johannes Kopf, et al., "Joint Bilateral Upsampling," ACM Transactions on Graphics vol. 26 Issue 3 Jul. 2007, pp. 1-5.

* cited by examiner

CLOSED LOOP DYNAMIC ISP THROTTLING

TECHNICAL FIELD

Embodiments of the disclosure are directed to hardware (HW) oriented algorithm design for image signal processors (ISP). In particular, embodiments of the present disclosure provide a novel approach to power consumption control for ISP's.

DISCUSSION OF THE RELATED ART

ISP's perform many image processing tasks, such as bad-pixel correction (BPC), remosaicing and rescaling. These tasks involve some understanding of the processed image patch that is achieved through a detailed analysis of image patches that is expensive in terms of power consumption. Thus, these analyses are gated by prefilters for very simple patches such as flat.

High frames-per-second (fps) and resolution imaging sensors power are prone to high power consumption due in part to the ISP. The added power causes the sensor to heat up, increasing noise levels which, in-turn, increases the processing load in an attempt to overcome the added noise. This cycle eventually takes a toll on the sensor performance both in terms of power and image quality. Current methods attempt to overcome this by applying different processing settings per expected noise level, where expectation is determined according to sensor mode operation, such as frame rate and gain. These methods often fall short of meeting the desired processing load because they operate in an "open loop" mode and cannot measure the processing load.

SUMMARY

Embodiments of the disclosure indirectly control the power consumption of an ISP through closed loop dynamic tuning.

According to an embodiment of the disclosure, there is provided a method of controlling power usage in an image signal processor. The method includes measuring an actual percentage of flat pixels in a digital image, adjusting a percentage threshold of flat pixels in the digital image, based on the measured actual percentage of flat pixels in the digital image, and processing the digital image by the image signal processor based on the percentage threshold of flat pixels. The percentage threshold of flat pixels is adjusted to reduce power used by the image signal processor in processing the digital image.

According to a further embodiment of the disclosure, measuring the actual percentage of flat pixels in the digital image comprises measuring an average pixel intensity of pixels in the digital image, counting a number of flat pixels whose intensity is within a predetermined variance of the average pixel intensity, and determining the actual percentage of flat pixels from a ratio of the number of flat pixels to a total number of pixels in the digital image.

According to a further embodiment of the disclosure, the percentage threshold of flat pixels in the digital image is adjusted according to a following formula:

$$u(t) = K_p e(t) + K_i \int e(t)dt + K_p \frac{de}{dt},$$

where u(t) is the percentage threshold of flat pixels, $K_p$ is a predetermined proportional gain, e(t) is a difference between the actual flat count and the expected percentage of flat counts, $K_i$ is a predetermined integral gain, de is a change in error value, and dt is a change in time.

According to a further embodiment of the disclosure, the expected percentage of flat counts is 70%.

According to a further embodiment of the disclosure, the method includes adjusting the percentage threshold of flat pixels based on the power usage of the image signal processor.

According to a further embodiment of the disclosure, the digital image was received from an active pixel sensor.

According to a further embodiment of the disclosure, processing the digital image based on the percentage threshold of flat pixels includes one or more of using an omnidirectional uniform filter or disabling direction and corner detection.

According to an embodiment of the disclosure, there is provided an image processing system. The system includes an active pixel sensor that acquires digital images, an analysis circuit that measures an actual percentage of flat pixels in a digital image received from the active pixel sensor, a controller that adjusts a percentage threshold of flat pixels in the digital image acquired from the active pixel sensor, based on the actual percentage of flat pixels measured by the analysis circuit, and an image signal processor that processes the digital image received from the analysis circuit based on the percentage threshold of flat pixels received from the controller. The percentage threshold of flat pixels is adjusted to reduce power used by the image signal processor in processing the digital image.

According to a further embodiment of the disclosure, the analysis circuit measures the actual percentage of flat pixels in the digital image by measuring an average pixel intensity of pixels in the digital image, and counts a number of flat pixels whose intensity is within a predetermined variance of the average pixel intensity, and determines the actual percentage of flat pixels from a ratio of the number of flat pixels to a total number of pixels in the digital image.

According to a further embodiment of the disclosure, the controller is a proportional-integral-derivative that adjusts the percentage threshold of flat pixels according to a following formula:

$$u(t) = K_p e(t) + K_i \int e(t)dt + K_p \frac{de}{dt},$$

where u(t) is the percentage threshold of flat pixels, $K_p$ is a predetermined proportional gain, e(t) is a difference between the actual flat count and the expected percentage of flat counts, $K_i$ is a predetermined integral gain, de is a change in error value, and dt is a change in time.

According to a further embodiment of the disclosure, the expected percentage of flat counts is 70%.

According to a further embodiment of the disclosure, the analysis circuit receives feedback from the image signal processor on power usage by the image signal processor, wherein the analysis circuit adjusts the percentage threshold of flat pixels based on the power usage of the image signal processor.

According to a further embodiment of the disclosure, based on the percentage threshold of flat pixels received from the controller, the image signal processor performs one or more of using an omnidirectional uniform filter or disabling direction and corner detection.

According to an embodiment of the disclosure, there is provided a non-transitory program storage device readable by a computer, tangibly embodying a program of instructions executed by the computer to perform method steps for controlling power usage in an image signal processor. The method steps include receiving a digital image from a sensor, measuring an actual value of a parameter in the digital image, wherein the parameter is a proxy for power usage in the image signal processor, adjusting a threshold value of the parameter, based on the measured actual value of the parameter, and processing the digital image by the image signal processor based on the threshold value of parameter. The threshold value of parameter has been adjusted to reduce power used by the image signal processor in processing the digital image.

According to a further embodiment of the disclosure, the parameter is one of a percentage of flat pixels, a percentage of monochromatic pixels of a color digital image, a focus level, or a noise level.

According to a further embodiment of the disclosure, when the parameter is the percentage of flat pixels, adjusting a threshold value comprises adjusting the percentage threshold of flat pixels in the digital image according to a following formula:

$$u(t) = K_p e(t) + K_i \int e(t)dt + K_p \frac{de}{dt},$$

where u(t) is the percentage threshold of flat pixels, $K_p$ is a predetermined proportional gain, e(t) is a difference between the actual flat count and the expected percentage of flat counts, $K_i$ is a predetermined integral gain, de is a change in error value, and dt is a change in time.

According to a further embodiment of the disclosure, when the parameter is chromaticity, processing the digital image on the threshold value of parameter comprises, in a monochrome part of the digital image, correcting color mismatches using white balance gains, and attenuating false colors by desaturating the digital color image.

According to a further embodiment of the disclosure, when the parameter is noise, processing the digital image on the threshold value of parameter comprises, adjusting noise reduction strength and disabling fine detail detectors.

According to a further embodiment of the disclosure, the method includes adjusting the percentage threshold of the parameter based on the power usage of the image signal processor.

DETAILED DESCRIPTION

Figure 1:
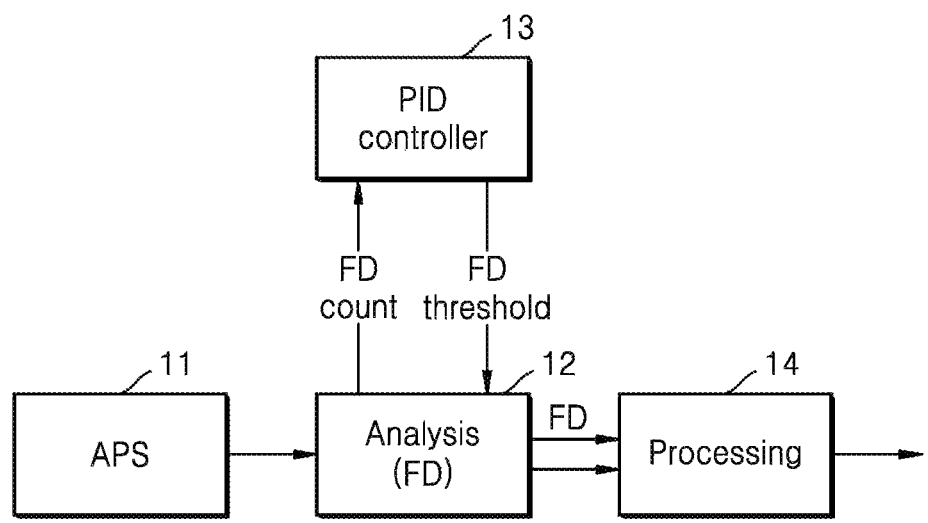
FIG. 1 illustrates an exemplary architecture of a system according to an embodiment of the disclosure.

Exemplary embodiments of the disclosure as described herein generally provide systems and methods for ISP power control based on controlling a parameter value that characterizes the power usage, such as the flat count thresholds. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

Systems according to embodiments of the disclosure can tune the flat prefilters or flat detectors (FD) in such a way that the power consumption can be limited in a way that is responsive to the scene content, which forms a closed loop.

According to embodiments of the disclosure, a camera analyzes the scene it is capturing and adjust its processing appropriately to consume less power. In an embodiment, ISPs can be tuned in a way that consumes less power by changing a set of tuning handles, such as a flatness threshold. This tuning controls a parameter that is measurable by the ISP and has some meaningful interpretation that relates to the content of a scene, such as the % of flat pixels from the frame. In addition, this parameter corresponds to the power consumption and can be used as a proxy for it.

Flat detection is a simple algorithm that can detect featureless patches on a scene where simple processing is sufficient to achieve high image quality. The detection is done locally, i.e., per pixel/patch, and once a detection is made, much of the processing load for the pixel/patch is relieved. The detection is based on measuring the variance on a given patch and comparing it to a predefined threshold or set-of-thresholds. The number of pixels detected as flat is counted for each frame in an internal counter of the ISP that is accessible to the ISP management code.

Ordinary images are typically about 70% flat, and therefore FD can significantly reduce the power consumed by consumed by the ISP. However, having a fixed threshold set is vulnerable to noise. Increased noise on the sensor, such as a result of heat, will cause fewer regions to be considered as flat, thus reducing the flat detection percentage, increasing the consumed power and resulting in a cycle of increasing power and degraded image quality.

Systems according to embodiments implement monitors in various parts of the ISP to measure how much each parameter is utilized, and to apply control loops according to these monitors to set a 'utilization rate' for each, or at least major, ISP component. For example, a flat detector detects flat patches in the image if the maximum value−minimum value of the patch is below some tunable threshold. From a power consumption perspective, a system according to an embodiment should detect as much flat as possible because it simplifies the processing, although at the expense of sharpness.

According to an embodiment, a simple counter, which is an aforementioned monitor, was implemented that counts the number of pixels detected as flat. If on a certain frame, too few pixels are detected as flat, the threshold is increased, and vice-versa. The threshold is controlled through a PID controller to avoid overshoots, i.e., extreme increases of the threshold, and ringing, in which the threshold swings between a few values and does not settle down even if the image remains constant. Lesser controllers are susceptible to these issues.

A controller based on a proportional-integral-derivative (PID), which is a family of control algorithms, is a classical temporal control algorithm that has a fast response and high stability. The control formula is EQ. (1), as follows:

$$u(t) = K_p e(t) + K_i \int e(t)dt + K_p \frac{de}{dt}, \qquad (1)$$

where:
u(t)=PID control variable;
$K_p$=proportional gain, which is the size of the control signal of the controller in proportion to an error;
e(t)=error value;
$K_i$=integral gain, which is how strongly the control signal depends on the averaged history (this factor attenuates responses to small vibrations in the input);
de=change in error value; and
dt=change in time.

A PID controller according to an embodiment of the disclosure for ISP tuning handles, such as flat detection, is implemented by defining:

$e(t)$=Flat count−expected (~70%)

$u(t)$=Flat thresholds

In this way, since the error value e(t) is the difference between the actual flat count and the expected percentage of flat counts, which is 70%, the flat thresholds u(t) can be changed to guarantee a flat detection equal to 70%, and stop the power cycle described above. Note that the 70% expected percentage of flat counts is exemplary, and embodiments of the disclosure are not necessarily limited to a 70% expected percentage of flat counts.

A system according to an embodiment is a coupling between the FD and the PID controller, as illustrated in FIG. 1. Referring to FIG. 1, a system includes an active pixel sensor (APS) 11 that is sensitive to light, and analysis circuit 12 that receives an image frame from the APS 11 performs flat detection (FD) by counting the percentage of flat pixels in the received frame, a PID controller circuit 13 that receives the FD count, such as the percentage of flat pixels, from the analysis circuit 12, determines the FD threshold according to the PID EQ. (1), above, and returns the FD threshold to the analysis circuit 12, and a processing circuit 14 that receives the image frame and FD indication from the analysis circuit 12 and completes the processing of the image frame based on the FD threshold. Once the FD indication has been provided, there are several processing options that can be invoked, such as using omni-directional uniform filters, which tend to blur edges and fine detail and are therefore avoided on non-flat patches, or disabling complicated detection algorithms such as direction and corner detection, since if the patch is flat there are not any corners.

In an embodiment, the processing power consumed is well correlated with the analysis circuit 12 results, such as the FD count. However, in an embodiment, the processing circuit 14 can provide feedback on power usage to the analysis circuit 12, and the analysis circuit 12 adjusts the FD threshold based on the power usage of the processing circuit 14.

The chosen definition of e(t) and u(t) is an embodiment of analyzing a scene and adjusting processing appropriately to consume less power through flat indication, but equivalent mechanisms can be designed based on other metrics. According to embodiments, other parameters that can be monitored as a proxy for power consumption include, but are not limited to, chromaticity (colorfulness), e.g. reducing color processing for monochromatic parts of an image, focus level and noise level.

Figure 2:
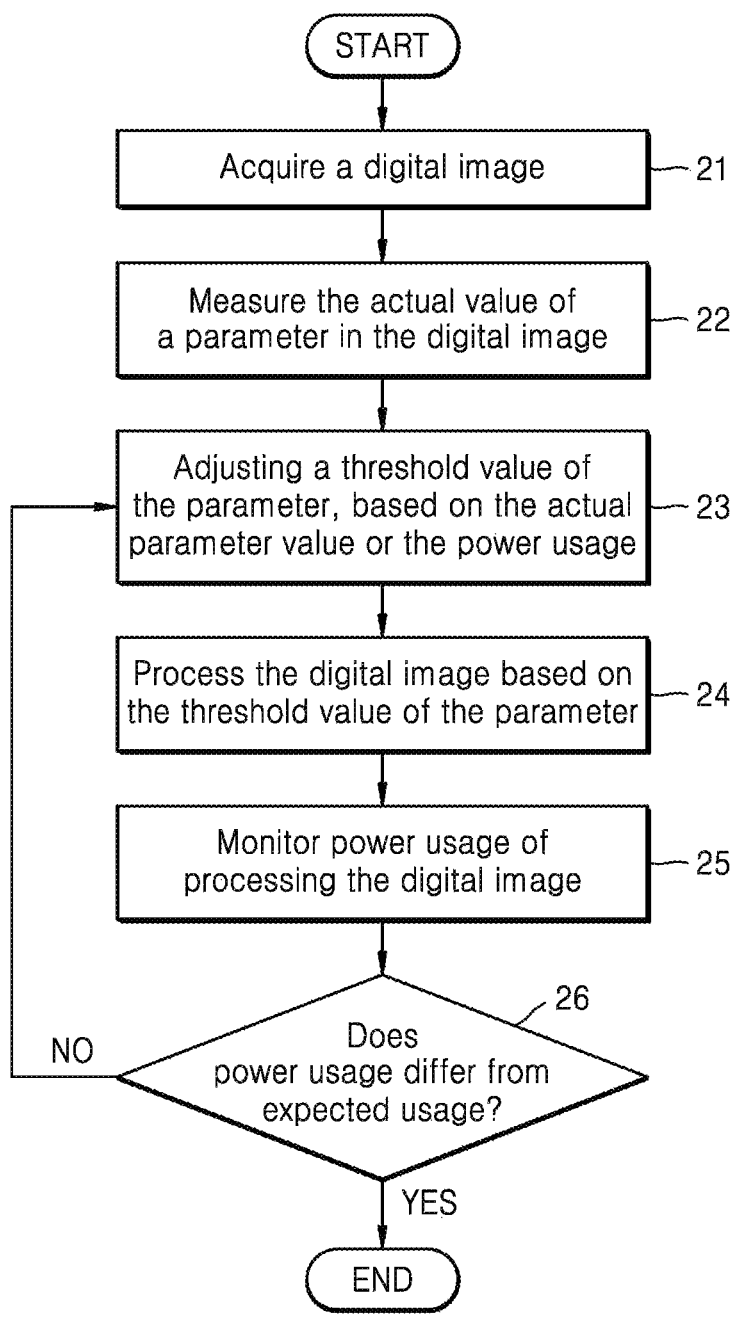
FIG. 2 is a flowchart that illustrates a method of controlling power usage in an image signal processor, according to an embodiment of the disclosure.

A method of controlling power usage in an image signal processor is illustrated by the flow chart of FIG. 2. Referring now to the figure, a method begins by receiving, at step 21, a digital image acquired by the active pixel sensor.

At step 22, the actual value of a parameter that characterizes the digital image is measured. In an embodiment in which the parameter is the flat threshold, this measurement includes measuring an actual percentage of flat pixels in the digital image by measuring an average pixel intensity of pixels in the digital image, counting a number of flat pixels whose intensity is within a predetermined variance of the average pixel intensity, and determining the actual percentage of flat pixels from a ratio of the number of flat pixels to a total number of pixels in the digital image. In an embodiment is which the parameter is chromaticity, this measurement includes measuring an actual percentage of monochromatic pixels in the digital image. Similarly, in an embodiment in with the parameter is noise level, this measurement includes measuring an actual percentage of noisy pixels in the digital image, and in an embodiment in with the parameter is focus level, this measurement includes measuring an actual percentage of in-focus pixels in the digital image.

At step 23, a threshold value of the parameter is adjusted, based on the measured actual value of the parameter. In an embodiment in which the parameter is the flat threshold, a percentage threshold of flat pixels in the digital image is adjusted, based on the measured actual percentage of flat pixels in the digital image, according to the formula of EQ. (1), above.

At step 24, the digital image is processed by the image signal processor based on the threshold value of parameter, such as the percentage threshold of flat pixels.

In an embodiment in which the parameter is chromaticity, in portions of the image with low chromaticity, for example, a monochrome part of the image, the white balance gains (WBG) can be used to correct all the color mismatches and provide a very low cost and very precise Remosaic/Demosaic. In addition, in portions of the image with low chromaticity, desaturation can be applied to the processed image to attenuate false colors that sometimes arise as an artifact of the ISP processing.

In an embodiment in which the parameter is noise, the noise levels are used to adjust noise reduction strength and disable fine detail detectors. In high noise situations, using these detectors can result in too many false detections and as a result 'false-detail' in the image.

In an embodiment, at step 25, the actual power usage of the image signal processor is monitored, and, at step 26, if the power usage deviates from a predetermined power usage level, the method loops back to step 23 where the parameter threshold value is adjusted based on the actual power usage.

A system according to embodiments of the disclosure reduces power in processing intensive modes. Processing intensive modes tend to consume a lot of power that eventually causes the sensor to heat up and generate more noise. Throttling the ISP to a predefined key performance indicator working point, such as % of flat, can cap the processing intensity, thus reducing power and the resulting noise.

A system according to embodiments of the disclosure provides consistent image quality throughout a video sequence. Modes with intensive processing, such as 8K video, consume high power, which causes a gradual increase of temperature and noise during operation. A closed loop ISP throttling according to an embodiment reduces and stabilizes the power consumption, resulting in consistent performance throughout a video sequence.

Figure 3:
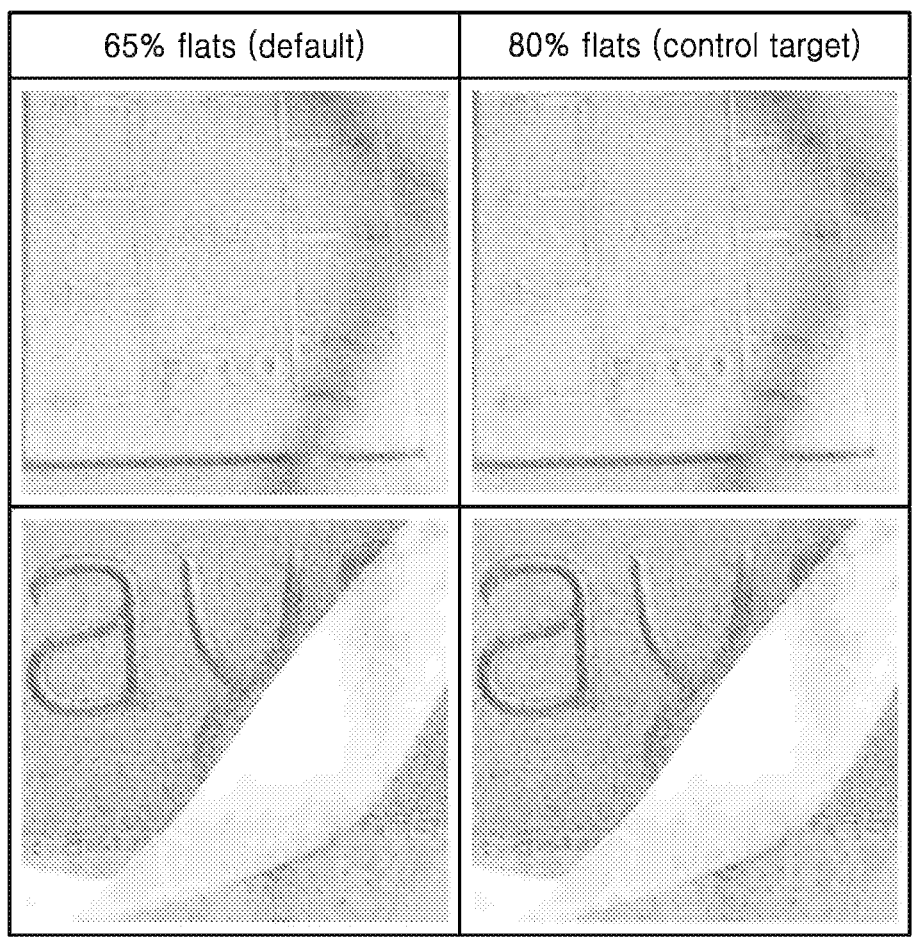
FIG. 3 illustrates an image quality comparison between image frames with a default flat count (65% flat) and a controlled flat count (80% flat), according to an embodiment of the disclosure.
Figure 4:
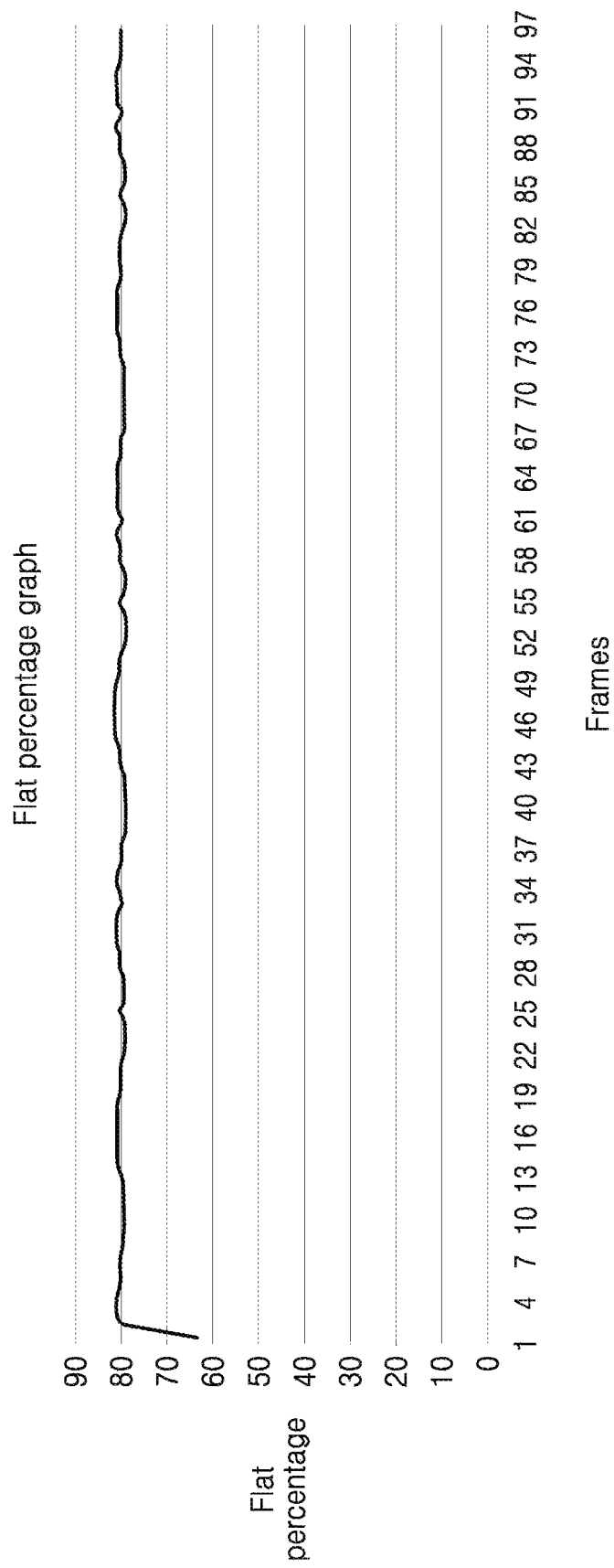
FIG. 4 is a graph of a flat PID controller convergence as a function of frames, according to an embodiment of the disclosure.

FIGS. 3 and 4 illustrate the rectification of a video sequence by methods according to embodiments of the disclosure. FIG. 3 compares image quality between a default flat count of 65% on the left side and a flat count controlled to be 80% flat on the right side, and FIG. 4 is a graph of the convergence of the flat percentage to a controlled value of 80% as a function of the number of frames. In FIG. 3, note the proper alignment of the various objects appearing in the video. The images of FIG. 3 show that even when proceeded by a method according to an embodiment of the disclosure, the image quality (IQ) remains visibly similar, showing that the reduced processing of the image is not generating lesser quality images. In FIG. 4, note the quick convergence (~4 frames) to the target flat threshold percentage.

System Implementations

It is to be understood that embodiments of the present disclosure can be implemented in various forms of hardware, software, firmware, special purpose processes, or a combination thereof. In one embodiment, the present disclosure can be implemented in hardware as an application-specific integrated circuit (ASIC), or as a field programmable gate array (FPGA). In another embodiment, the present disclosure can be implemented in software as an application program tangible embodied on a computer readable program storage device. The application program can be uploaded to, and executed by, a machine comprising any suitable architecture.

Figure 5:
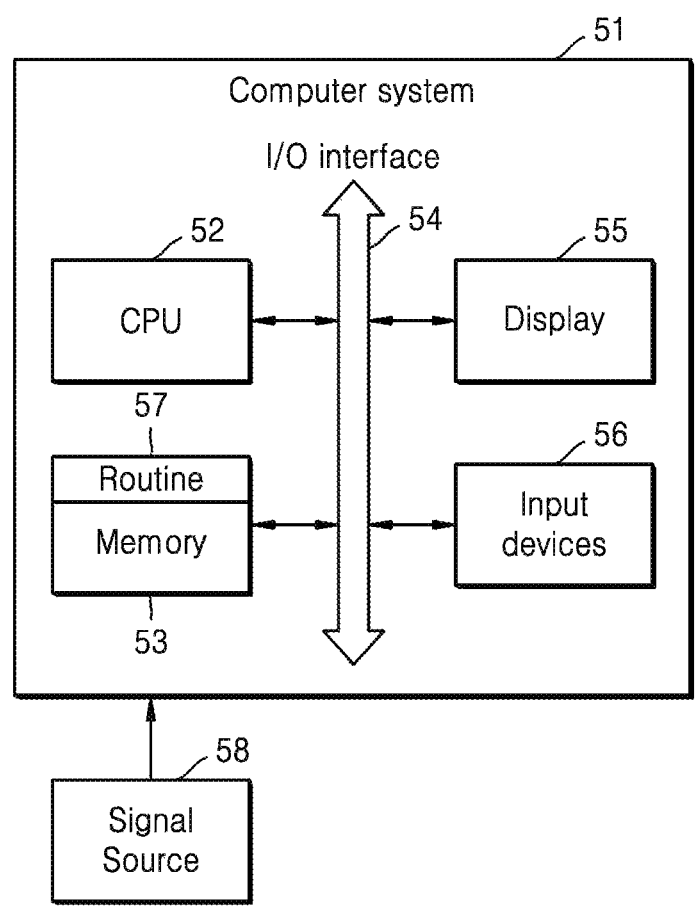
FIG. 5 is a block diagram of a system for implementing a method of ISP power control, according to an embodiment of the disclosure.

FIG. 5 is a block diagram of a system for implementing a method of ISP power control, according to an embodiment of the disclosure. Referring now to FIG. 5, a computer system 51 for implementing the present disclosure can comprise, inter alia, a central processing unit (CPU) or controller 52, a memory 53 and an input/output (I/O) interface 54. The computer system 51 is generally coupled through the I/O interface 54 to a display 55 and various input devices 56 such as a mouse and a keyboard. The support circuits can include circuits such as cache, power supplies, clock circuits, and a communication bus. The memory 53 can include random access memory (RAM), read only memory (ROM), disk drive, tape drive, etc., or a combinations thereof. The present disclosure can be implemented as a routine 57 that is stored in memory 53 and executed by the CPU or controller 52 to process the signal from the signal source 58. As such, the computer system 51 is a general purpose computer system that becomes a specific purpose computer system when executing the routine 57 of the present disclosure. Alternatively, as described above, embodiments of the present disclosure can be implemented as an ASIC or FPGA 57 that is in signal communication with the CPU or controller 52 to process the signal from the signal source 58.

The computer system 51 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present disclosure is programmed. Given the teachings of the present disclosure provided herein, one of ordinary skill in the related art will be able to contemplate these and similar implementations or configurations of the present disclosure.

While the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A method of controlling power usage in an image signal processor, comprising:
measuring an actual percentage of flat pixels in a digital image;
adjusting a percentage threshold of flat pixels in the digital image, based on the measured actual percentage of flat pixels in the digital image; and
processing the digital image by the image signal processor based on the percentage threshold of flat pixels,
wherein the percentage threshold of flat pixels has been adjusted to reduce power used by the image signal processor in processing the digital image.

2. The method of claim 1, wherein measuring the actual percentage of flat pixels in the digital image comprises measuring an average pixel intensity of pixels in the digital image, counting a number of flat pixels whose intensity is within a predetermined variance of the average pixel intensity, and determining the actual percentage of flat pixels from a ratio of the number of flat pixels to a total number of pixels in the digital image.

3. The method of claim 1, wherein the percentage threshold of flat pixels in the digital image is adjusted according to a following formula:

$$u(t) = K_p e(t) + K_i \int e(t)dt + K_p \frac{de}{dt},$$

wherein
u(t) is the percentage threshold of flat pixels;
$K_p$ is a predetermined proportional gain;
e(t) is a difference between the actual flat count and the expected percentage of flat counts;
$K_i$ is a predetermined integral gain;
de is a change in error value; and
dt is a change in time.

4. The method of claim 3, wherein the expected percentage of flat counts is 70%.

5. The method of claim 1, further comprising adjusting the percentage threshold of flat pixels based on the power usage of the image signal processor.

6. The method of claim 1, wherein the digital image was received from an active pixel sensor.

7. The method of claim 1, wherein processing the digital image based on the percentage threshold of flat pixels comprises one or more of using an omnidirectional uniform filter or disabling direction and corner detection.

8. An image processing system, comprising:
an active pixel sensor that acquires digital images;
an analysis circuit that measures an actual percentage of flat pixels in a digital image received from the active pixel sensor;
a controller that adjusts a percentage threshold of flat pixels in the digital image acquired from the active pixel sensor, based on the actual percentage of flat pixels measured by the analysis circuit; and
an image signal processor that processes the digital image received from the analysis circuit based on the percentage threshold of flat pixels received from the controller,
wherein the percentage threshold of flat pixels is adjusted to reduce power used by the image signal processor in processing the digital image.

9. The system of claim 8, wherein the analysis circuit measures the actual percentage of flat pixels in the digital image by measuring an average pixel intensity of pixels in the digital image, and counts a number of flat pixels whose intensity is within a predetermined variance of the average pixel intensity, and determines the actual percentage of flat pixels from a ratio of the number of flat pixels to a total number of pixels in the digital image.

10. The system of claim 8, wherein the controller is a proportional-integral-derivative that adjusts the percentage threshold of flat pixels according to a following formula:

$$u(t) = K_p e(t) + K_i \int e(t)dt + K_p \frac{de}{dt},$$

wherein
u(t) is the percentage threshold of flat pixels;
$K_p$ is a predetermined proportional gain;
e(t) is a difference between the actual flat count and the expected percentage of flat counts;
$K_i$ is a predetermined integral gain;
de is a change in error value; and
dt is a change in time.

11. The system of claim 10, wherein the expected percentage of flat counts is 70%.

12. The system of claim 8, wherein the analysis circuit receives feedback from the image signal processor on power usage by the image signal processor, wherein the analysis circuit adjusts the percentage threshold of flat pixels based on the power usage of the image signal processor.

13. The system of claim 8, wherein, based on the percentage threshold of flat pixels received from the controller, the image signal processor performs one or more of using an omnidirectional uniform filter or disabling direction and corner detection.

14. A non-transitory program storage device readable by a computer, tangibly embodying a program of instructions executed by the computer to perform method steps for controlling power usage in an image signal processor, the method steps comprising:
receiving a digital image from a sensor;
measuring an actual value of a parameter in the digital image, wherein the parameter is a proxy for power usage in the image signal processor;
adjusting a threshold value of the parameter, based on the measured actual value of the parameter; and
processing the digital image by the image signal processor based on the threshold value of parameter,
wherein the threshold value of parameter is adjusted to reduce power used by the image signal processor in processing the digital image.

15. The non-transitory computer readable program storage device of claim 14, wherein the parameter is one of a percentage of flat pixels, a percentage of monochromatic pixels of a color digital image, a focus level, or a noise level.

16. The non-transitory computer readable program storage device of claim 15, wherein, when the parameter is the percentage of flat pixels, adjusting a threshold value comprises adjusting the percentage threshold of flat pixels in the digital image according to a following formula:

$$u(t) = K_p e(t) + K_i \int e(t)dt + K_p \frac{de}{dt},$$

wherein
u(t) is the percentage threshold of flat pixels;
$K_p$ is a predetermined proportional gain;
e(t) is a difference between the actual flat count and the expected percentage of flat counts;
$K_i$ is a predetermined integral gain;
de is a change in error value; and
dt is a change in time.

17. The non-transitory computer readable program storage device of claim 15, wherein, when the parameter is chromaticity, processing the digital image on the threshold value of parameter comprises, in a monochrome part of the digital image, correcting color mismatches using white balance gains, and attenuating false colors by desaturating the digital color image.

18. The non-transitory computer readable program storage device of claim 15, wherein, when the parameter is noise, processing the digital image on the threshold value of parameter comprises, adjusting noise reduction strength and disabling fine detail detectors.

19. The non-transitory computer readable program storage device of claim 14, further comprising adjusting the percentage threshold of the parameter based on the power usage of the image signal processor.

* * * * *